UNITED STATES PATENT OFFICE.

CHARLES ARNOIS, OF BROOKLYN, ASSIGNOR OF ONE-HALF HIS RIGHT TO DODGE & OLCOTT, OF NEW YORK, N. Y.

IMPROVEMENT IN BAKING-POWDERS.

Specification forming part of Letters Patent No. 174,890, dated March 21, 1876; application filed March 1, 1876.

*To all whom it may concern:*

Be it known that I, CHARLES ARNOIS, of the city of Brooklyn, Kings county, New York, have invented certain Improvements in Baking-Powders; and I do hereby declare the following to be a full and correct description of the same.

This invention relates to the class of compositions or compounds designed to be mixed with the materials used in making bread, cake, pastry, and similar articles, for the purpose of raising the same.

It consists of a compound of muriate of ammonia with its chemical equivalent alkaline carbonates, in such proportions that when mixed with the materials used in making bread, cake, pastry, and similar articles, it will form, on the application of heat in the process of baking or cooking, carbonate or bicarbonate of ammonia and muriate of soda, or common salt, or the muriate of potash.

To make the compound, take of muriate of ammonia fifty-three and five-tenths ($53\frac{5}{10}$) parts, with its chemical equivalent of either of the following alkaline carbonates: Bicarbonate of soda, eighty-four (84) parts; carbonate of soda, fifty-three (53) parts; bicarbonate of potash, one hundred and one-fifth ($100\frac{1}{5}$) parts; carbonate of potash, sixty-nine and one-fifth ($69\frac{1}{5}$) parts, or any other alkaline carbonate, in its equivalent proportion, that will form, on the application of heat in the process of baking or cooking, or any similar process, carbonate or bicarbonate of ammonia and muriate of soda, or common salt, or muriate of potash, and mix them together in any convenient manner.

The compound thus made forms a useful baking-powder. It may be used dry with the flour, or, preferably, by dissolving it in the water or milk employed in making the dough for bread, cake, pastry, and similar articles.

When the dough having this compound incorporated in it is subjected to the heat necessary for baking or cooking it, carbonic acid will be formed and volatilized, thus raising the bread, cake, &c., while the muriate of soda or muriate of potash will remain in it.

Having thus described my invention, what I claim is—

The compound consisting of muriate of ammonia and its chemical equivalent of alkaline carbonates, in the proportions substantially as described, for incorporation with the dough of bread, cake, pastry, and similar articles, as and for the purpose set forth.

The above specification of my said invention signed and witnessed at New York city this 29th day of February, A. D. 1876.

CHARLES ARNOIS.

Witnesses:
NATH. A. PRENTISS,
GEO. W. WHITTY.